Dec. 26, 1950  A. J. Z. CAAN  2,535,348
OPTICAL RECORDING APPARATUS FOR SEISMIC WAVES
Filed March 8, 1949  2 Sheets-Sheet 1

INVENTOR.
Albert J. Z. Caan
BY
AGENT OR ATTORNEY

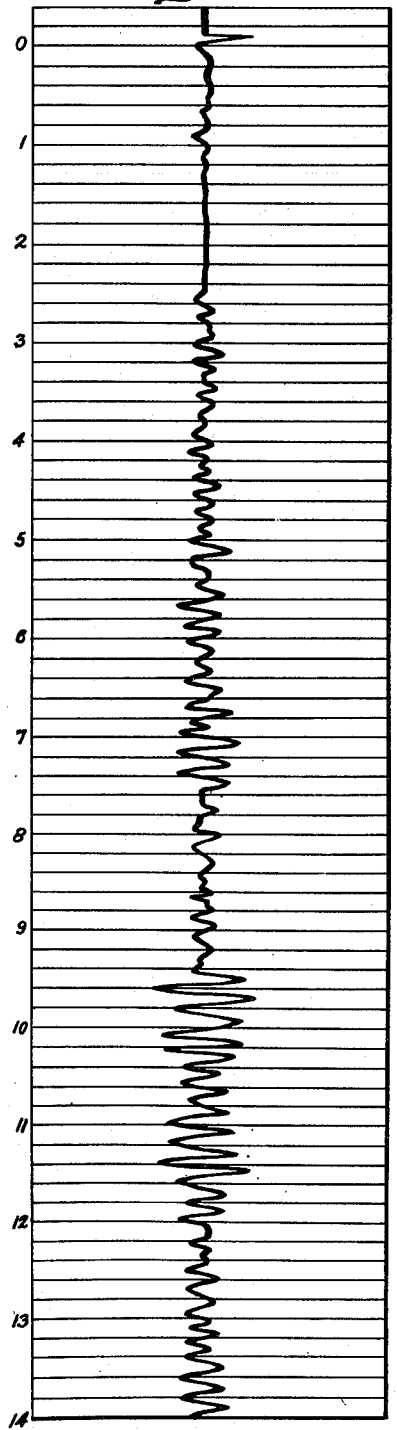
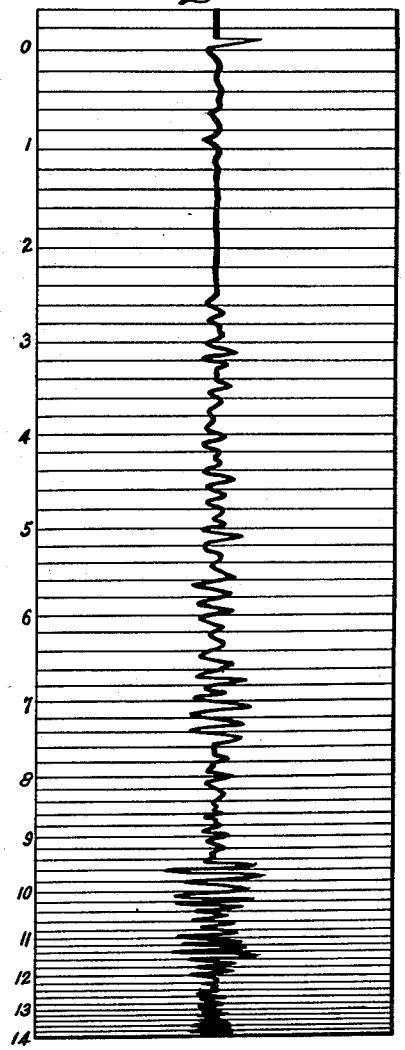

Patented Dec. 26, 1950

2,535,348

UNITED STATES PATENT OFFICE 2,535,348

OPTICAL RECORDING APPARATUS FOR SEISMIC WAVES

Albert J. Z. Caan, New York, N. Y., assignor to Socony-Vacuum Oil Company, Incorporated, New York, N. Y., a corporation of New York Application March 8, 1949, Serial No. 80,155

2 Claims. (Cl. 346—33)

This invention is directed to an improvement in the plotting of seismic recordings from data obtained during geophysical surveys of subsurface strata.

In conducting such surveys by seismic methods to determine the contour of subsurface interfaces and other related information, the usual practice is to record discrete reflections with respect to time upon a ribbon of sensitized recording paper or photographic film. A charge of dynamite is exploded, at a predetermined depth below the surface in a drill ho'e, and the reflected waves from substrata interfaces, set up by the explosion, are detected by geophones located at the surface, in a fixed pattern with reference to the drill hole. The energy received by the geophones is caused to actuate a recorder making a record upon a moving ribbon or strip in the form of traces. The strip is moved, at a substantially fixed rate of speed, and is marked with equally spaced parallel transverse lines to indicate the passage of accurate, small, time intervals. A time-break mark is placed on at least one of the traces at the instant of exp'osion of the dynamite charge. Thus each trace, containing the data from one geophone, represents a record of subsurface wave intelligence versus time.

In one method of surveying, a geophone is located adjacent the top of the drill hole wherein the dynamite charge is placed. This instrument picks up a wave signal from the explosion travelling vertically through the weathered layer to the surface. Knowing the depth of the dynamite charge in the drill hole, the velocity of wave propagation through the weathered layer can be calcu'ated. It is customary to obtain the working data by means of several geophones arranged in a straight line with respect to the drill hole. This is known in the art as the conventional spread. Each geophone receives first the wave transmitted directly through the weathered layer, followed by the discrete reflections from the various interfaces between the different layers of earth.

However, because the subsurface strata possess differing densities, the velocity of wave propagation in each stratum must be determined by comparatively complex procedures and calculations. Because of the differing densities, the trace of reflections versus time yields little useful information unless replotted to a chart of reflection data versus depth. Thus, laborious and painstaking work must be done to calculate the depth information and replot the seismic data to a depth scale in order that useful geophysical information about the strata and the contour of the interface planes between the strata may be obtained.

This data is used, particularly in the oil industry, to plot contour maps of the interfaces between subsurface strata. Geologists know that it is possible that oil may be located in areas where certain combinations of subsurface rock are found. Thus, an oil "pool" is not an open lake of oil, but is a porous rock or sand, saturated with oil. Oil accumulates only from various "source" rocks such as shale rocks containing organic matter. Further the oil is continually migrating, unless restrained by an impervious rock or "cap" rock, located over the oil containing rock. In practice the oil in the reservoir rock is not sufficiently concentrated to form a pool except where the cap rock presents some irregularity or discontinuity wherein the oil may become trapped, preventing further migration. Such deformations in the formation of the cap rock which serve to trap the oil are called "structures." Thus in seismic surveying the geologist is searching for such irregularities in interface planes, in areas which contain the reservoir rock, source rock, and cap rock, indicating the possible location of an oil pool.

With the above in mind, the geologists, from data taken from the seismic records plotted to a depth scale, and consideration of other related data, can determine the location of the structures.

The object of this invention is to provide a method of and apparatus for readily transferring seismic data from a time scale to a depth scale. A further object of this invention is to eliminate the laborious, tedious calculations necessary to convert a recording of seismic data from a time scale to a depth scale.

A further object of this invention is to permit the ready production of a continuous straight-line contour map of subsurface interfaces from data taken in the conventional spread.

These and other objects will be made apparent by reference to the attached drawing, the following specification, and the appended claims.

The Figure 1 is a schematic sketch, in perspective, of a means of and apparatus for applying the instant invention.

Figure 3 shows a typical time scale seismic record.

Figure 4 is a view similar to Figure 3 but showing a depth scale record made according to the present invention from the time scale record of Figure 3.

Figure 1:
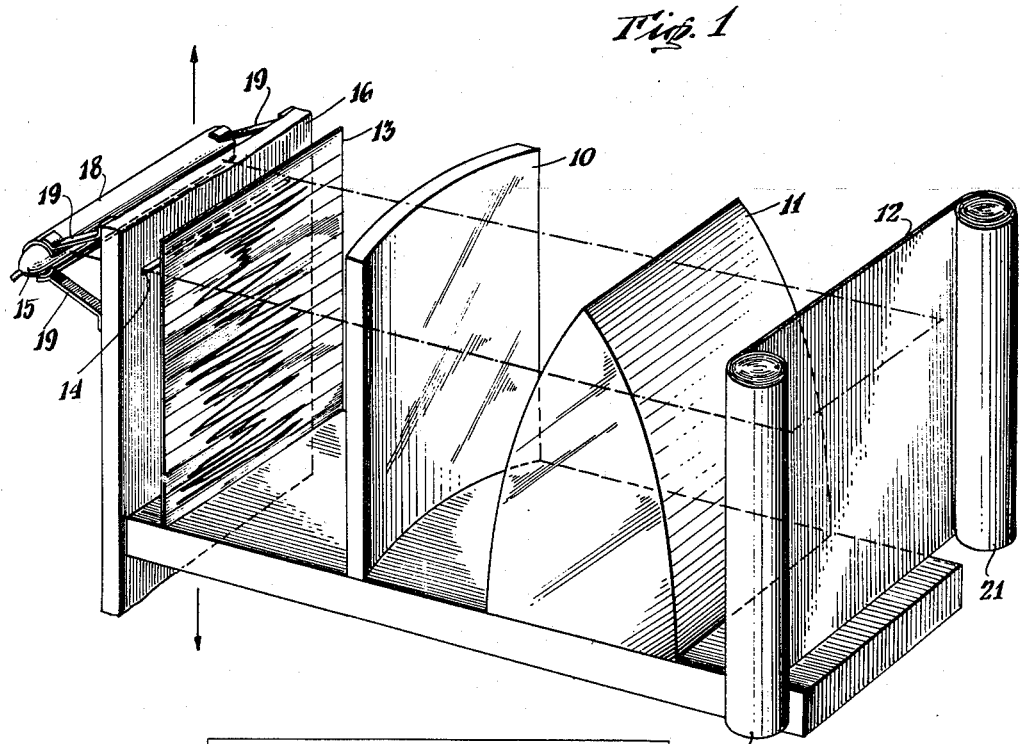

The essential details of this invention may be shown most clearly by reference to the attached drawing, in which is shown a substantially parabolic lens 11, a collimating lens 10, a sensitized recording paper 12, a seismic record in terms of time 13, a slit opening 14 and a source of light 15. A typical record such as appears at 13 is shown in Figure 3.

The members are arranged such that the light from the source 15, which passes through the slit opening 14, is transmitted through the seismic record. The collimating lens 10 is used to collect the transmitted light rays 17, 17, to prevent scattering, and to keep the transmitted image within a suitable spread. The rays, transmitted through the collimating lens 10, are passed through the substantially parabolic lens 11. The refracted rays are received from the lens upon a suitable sensitive paper 12, such that a distorted image of the original seismic record 13 is placed thereon. The desired record of subsurface data versus depth is obtained by simply developing the image placed on the sensitized paper 12. A typical record producible on the sensitized paper 12 is shown in Figure 4, that record being producible from the corresponding time record shown in Figure 3.

Figure 2:
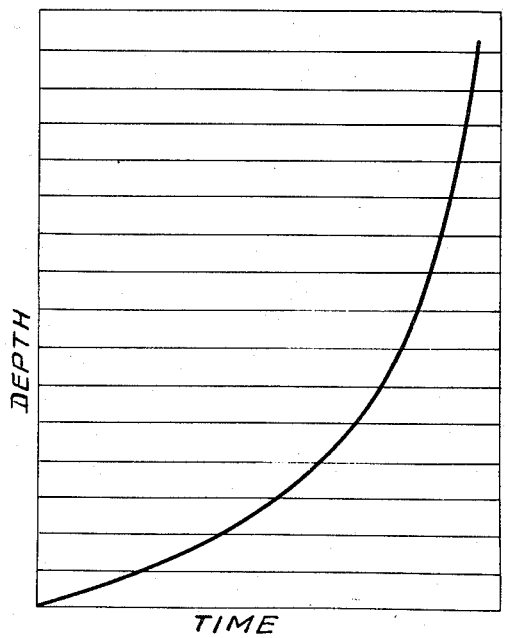
Figure 2 is a plot of Depth v. Time for a particular location.

The lens 11 must be carefully constructed in such a shape that the rays, received in terms of time, will be transmitted in terms of depth. This is obtained by shaping the lens to conform to the time-depth curve of the particular area being surveyed. Although the time-depth curve will vary from area to area, for any given area it will be substantially constant. Thus a few lenses would accommodate a major portion of the seismic surveying in any given region. Figure 2 shows a plot of Depth v. Time for a particular area. These plots can be made from the data obtained from a conventional spread, in a manner familiar to those working in the art, and will not be explained in detail here. From the Depth v. Time plot the lens above described may be constructed.

The slit opening 14 may be located in a member 16, so mounted that it can be moved vertically as desired. For proper alignment, the source of light 15 may be mounted in a frame 18, attached by means of the supporting leg 19, 19 to the movable member 16. In transmitting the record, therefore, the member 16 is positioned so that light is transmitted through the top of the seismic record 13, and the movable member is lowered at a suitable speed to transmit the entire seismic record 13 to the sensitized paper 12.

The resultant record on strip 12 will bear a marked resemblance to the record on strip 13 but will differ therefrom in that the former is recorded with respect to time and the latter is recorded with respect to depth. By rolling the sensitized paper 12 on a roll 20, and unrolling fresh paper from roll 21, a fresh area of photographic paper can be exposed to receive a second record. Development of the one sheet will therefore provide the data in a convenient usable form for the entire area.

It is clear, and within the contemplation of this invention that other forms of radiant energy than light rays may be used to transmit the recording from the time scale to the depth scale. It is also intended that reflected rays of energy may be used, where suitable, instead of using transmitted rays to transfer the image. These and other obvious variations are within the meaning of this invention; the only limitations imposed are those of the appended claims.

I claim:

1. Apparatus for converting seismic recordings in terms of time to seismic recordings in terms of depth consisting of a lamp emitting light rays, a member attached thereto possessing a slit opening adjacent to said lamp, said lamp and said member being capable of reciprocation in a vertical direction to cause substantially parallel rays of energy to pass through said slit, a stationary seismic recording in terms of time aligned with said slit so as to receive said rays over its length during said reciprocation, a collimating lens for preventing the natural distortion of said rays passing through said seismic recording in terms of time, a distortion lens for distorting the rays thus corrected by said collimating lens from a time scale to a depth scale, said distortion lens having a shape determined by the time-depth curve of the area being surveyed, stationary detection means to receive the rays after they have passed through said distortion lens, said collimating lens and said distortion lens being positioned between said seismic recording in terms of time and said detection means.

2. Apparatus as defined in claim 1 further characterized in that the stationary detection means is a sensitized paper

ALBERT J. Z. CAAN.

REFERENCES CITED

The following references are of record in the file of this patent:

UNITED STATES PATENTS

| Number | Name | Date |
|---|---|---|
| 1,186,717 | Walker | June 13, 1916 |
| 1,656,255 | Wente | Jan. 17, 1928 |
| 1,767,790 | Gerlack | June 24, 1930 |
| 2,006,890 | Grossman | July 2, 1935 |
| 2,141,964 | Yonker | Dec. 27, 1938 |
| 2,243,729 | Ellis | May 27, 1941 |
| 2,348,050 | Barnstyn | May 2, 1944 |